(12) United States Patent
Wolf et al.

(10) Patent No.: US 11,987,075 B2
(45) Date of Patent: May 21, 2024

(54) FABRICATED VEHICLE WHEEL WITH WHEEL DISC HAVING LIGHTENER POCKETS

(71) Applicant: Maxion Wheels Holding GmbH, Königswinter (DE)

(72) Inventors: Joseph W. Wolf, Canton, MI (US); Fernando T. Mitsuyassu, Limeira (BR)

(73) Assignee: Maxion Wheels Holding GmbH, Königswinter (DE)

(*) Notice: Subject to any disclaimer, the term of this patent is extended or adjusted under 35 U.S.C. 154(b) by 827 days.

(21) Appl. No.: 17/048,680

(22) PCT Filed: Apr. 19, 2019

(86) PCT No.: PCT/US2019/028232
§ 371 (c)(1),
(2) Date: Oct. 19, 2020

(87) PCT Pub. No.: WO2019/204681
PCT Pub. Date: Oct. 24, 2019

(65) Prior Publication Data
US 2021/0237506 A1 Aug. 5, 2021

Related U.S. Application Data

(60) Provisional application No. 62/659,737, filed on Apr. 19, 2018.

(51) Int. Cl.
*B60B 3/00* (2006.01)
*B60B 3/16* (2006.01)

(52) U.S. Cl.
CPC .............. *B60B 3/004* (2013.01); *B60B 3/008* (2013.01); *B60B 3/16* (2013.01);
(Continued)

(58) Field of Classification Search
CPC .......... B60B 3/004; B60B 3/008; B60B 3/16; B60B 3/04; B60B 2310/213;
(Continued)

(56) References Cited

U.S. PATENT DOCUMENTS 3,582,141 A * 6/1971 Kelsey, Jr. ................ B60B 3/12
428/116
3,659,901 A * 5/1972 Porsche .................... B60B 1/08
301/65

(Continued)

FOREIGN PATENT DOCUMENTS

JP  H10180400 A  7/1998
JP  2001071702 A  3/2001
(Continued)

OTHER PUBLICATIONS

Japanese Office Action, Application No. 2020-556273, dated Mar. 10, 2023.
(Continued)

*Primary Examiner* — S. Joseph Morano
*Assistant Examiner* — Emily G. Castonguay
(74) *Attorney, Agent, or Firm* — MacMillan, Sobanski & Todd, LLC

(57) ABSTRACT

A fabricated vehicle wheel comprises a wheel disc and a wheel rim. The wheel disc has an annular hub portion, a center hub hole in the hub portion, opposite inboard and outboard faces of the hub portion, a plurality of circumferentially spaced lug bolt holes in the hub portion, a plurality of lightener pockets in the hub portion, and an extension portion. The lug bolt holes and the lightener pockets alternate around a circumference of the hub portion. An axis extends through the hub hole. The inboard face is planar and configured to mount to a vehicle. The inboard face is perpendicular to the axis and the extension portion extends (Continued)

from the hub portion along the axis. The wheel rim is secured to the extension portion.

11 Claims, 7 Drawing Sheets

(52) U.S. Cl.
CPC ... *B60B 2310/213* (2013.01); *B60B 2310/226* (2013.01); *B60B 2310/228* (2013.01); *B60B 2310/232* (2013.01); *B60B 2360/102* (2013.01); *B60B 2900/111* (2013.01); *B60B 2900/513* (2013.01); *B60B 2900/711* (2013.01)

(58) Field of Classification Search
CPC ........ B60B 2310/226; B60B 2310/228; B60B 2310/232; B60B 2360/102; B60B 2900/111; B60B 2900/513; B60B 2900/711
See application file for complete search history.

(56) References Cited

U.S. PATENT DOCUMENTS

| | | | |
|---|---|---|---|
| 5,026,122 | A | 6/1991 | Grubisic et al. |
| 5,427,171 | A | 6/1995 | Prieto |
| 5,490,720 | A | 2/1996 | Archibald |
| 5,494,335 | A * | 2/1996 | Kruger ................... B60B 3/142 301/35.61 |
| 6,293,630 | B1 | 9/2001 | Separautzki et al. |
| 6,517,165 | B1 | 2/2003 | Handa |
| 7,108,332 | B2 | 9/2006 | Yoo et al. |
| 9,375,976 | B1 * | 6/2016 | Liu .......................... B60B 1/06 |
| 9,481,205 | B2 | 11/2016 | Rider et al. |
| 2007/0278850 | A1 * | 12/2007 | Rodrigues ................ B60B 3/10 301/63.103 |
| 2017/0058994 | A1 | 3/2017 | Lim |

FOREIGN PATENT DOCUMENTS

| | | | | |
|---|---|---|---|---|
| JP | 2002114002 | A | 4/2002 | |
| JP | 2002283801 | A | 10/2002 | |
| JP | 2003320801 | A | 11/2003 | |
| JP | 2006082733 | A | 3/2006 | |
| JP | 2009092105 | A | 4/2009 | |
| JP | 2009096377 | A | 5/2009 | |
| JP | 5322397 | B2 | 10/2013 | |
| KR | 20170004769 | A | 1/2017 | |
| WO | WO-2016020890 | A1 * | 2/2016 | ............. B60B 11/02 |
| WO | 2017048761 | A1 | 3/2017 | |

OTHER PUBLICATIONS

Indian Examination Report under section 12 & 13 of the Patents Act, 1970 and the Patents Rules, Application No. 202248057218, dated Oct. 18, 2022.
European Supplementary Search Report, Application No. 19788506. 4, dated Nov. 10, 2021.
International Search Report and Written Opinion, Application No. PCT/US2019/028232, dated Jul. 10, 2019.
Indian Examination Report under sections 12 & 13 of the Patents Act, 1970 and the Patents Rules, 2003, Application No. 202047049387, dated May 6, 2022.
Korean Office Action, Application No. 10-2020-7033218, dated Jul. 19, 2023.
Chinese Office Action, Application No. 201980026605.9, dated Jul. 22, 2023.

* cited by examiner

FABRICATED VEHICLE WHEEL WITH WHEEL DISC HAVING LIGHTENER POCKETS

CROSS REFERENCE TO RELATED APPLICATION

This application claims priority to, and the benefit of, U.S. Provisional Application Ser. No. 62/659,737, filed Apr. 19, 2018, the full disclosure of which is incorporated herein by reference in entirety.

BACKGROUND OF THE INVENTION

The present invention relates generally to vehicle wheels and in particular to an improved fabricated vehicle wheel with a wheel disc having lightener pockets.

Fuel economy of a vehicle is inversely related to a vehicle mass of the vehicle. As the vehicle mass decreases, the fuel economy increases. It is desirable to minimize the vehicle mass in order to maximize the fuel economy of the vehicle. The vehicle mass includes a wheel mass of vehicle wheels of the vehicle. The wheel mass effects the fuel economy of the vehicle such that reducing the wheel mass increases the fuel economy. However, reducing the wheel mass increases complexity and cost for manufacturing the vehicle wheels. Thus, it would be desirable to reduce the wheel mass such that the resulting increased complexity and cost is offset by an increase in the fuel economy of the vehicle.

SUMMARY OF THE INVENTION

The present invention relates to an improved fabricated vehicle wheel with a wheel disc having lightener pockets.

According to one embodiment, a wheel disc may comprise, individually and/or in combination, one or more of the following features, elements, or advantages: an annular hub portion having an outboard face and an inboard face, an extension portion extending from the hub portion, a plurality of lug bolt holes in the hub portion, a center hub hole in the hub portion, and at least one lightener pocket in the hub portion. The wheel disc is for a vehicle wheel.

According to this embodiment, the wheel disc may further comprise a wheel rim secured to the extension portion.

According to this embodiment, at least one lightener pocket is a recess in the outboard face or the inboard face.

According to this embodiment, at least one lightener pocket extends through the hub portion.

According to this embodiment, at least one lightener pocket that extends through the hub portion has an opening in each of the outboard face and the inboard face.

According to this embodiment, the wheel disc may further comprise a first portion of the hub portion and an annular hub plate secured to the first portion. The extension portion extends from the first portion. At least one lightener pocket is in the hub plate and the hub plate is configured to be secured to the first portion. The first portion is without at least one lightener pocket.

According to this embodiment, at least one lightener pocket is interspaced with the lug bolt holes.

According to this embodiment, at least one lightener pocket is one of a plurality of lightener pockets, and the lightener pockets and the lug bolt holes alternate around a circumference of the hub portion.

According to this embodiment, at least one lightener pocket reduces the mass of the wheel disc between zero and two percent.

According to this embodiment, at least one lightener pocket is between zero and fifty percent of a surface area of either the outboard face or the inboard face.

According to this embodiment, a depth of at least one lightener pocket is between twenty five and one hundred percent of a thickness of the hub portion.

According to this embodiment, at least one lightener pocket is formed by removing material from the hub portion.

According to this embodiment, the material is removed from the hub portion by machining, milling, piercing, laser cutting, or water cutting.

According to this embodiment, the wheel rim and wheel disc are formed from similar or dissimilar materials According to this embodiment, the vehicle wheel is a steel commercial vehicle wheel.

According to another embodiment, a vehicle wheel may comprise, individually and/or in combination, one or more of the following features, elements, or advantages: a wheel disc, an annular hub portion of the wheel disc, a center hub hole in the hub portion, an axis through the hub hole, a planar inboard face of the hub portion that is perpendicular to the axis and configured to mount to a vehicle, an outboard face of the hub portion opposite the inboard face, a plurality of circumferentially spaced lug bolt holes in the hub portion, a plurality of lightener pockets in the hub portion, an extension portion extending from the hub portion along the axis, and a wheel rim secured to the extension portion. The lug bolt holes and the lightener pockets alternate around a circumference of the hub portion.

According to this embodiment, the lightener pockets are recesses extending into the outboard face or the inboard face.

According to this embodiment, the lightener pockets extend through the hub portion and have openings in each of the outboard face and the inboard face.

According to this embodiment, the vehicle wheel may further comprise a first portion of the hub portion and an annular hub plate secured to the first portion. The extension portion extends from the first portion. The lightener pockets are in the hub plate and the hub plate is configured to be secured to the first portion. The first portion is without the lightener pockets.

According to this embodiment, the vehicle wheel may further comprise a plurality of ventilation openings in the extension portion.

One or more potential and/or realized advantage(s) of an embodiment of the wheel disc, and vehicle wheel including the wheel disc, includes a reduction in wheel mass. Other advantages of this invention will become apparent to those skilled in the art from the following detailed description of the invention and preferred embodiments, when read in light of the accompanying drawings.

DETAILED DESCRIPTION OF THE PREFERRED EMBODIMENTS

Figure 1:
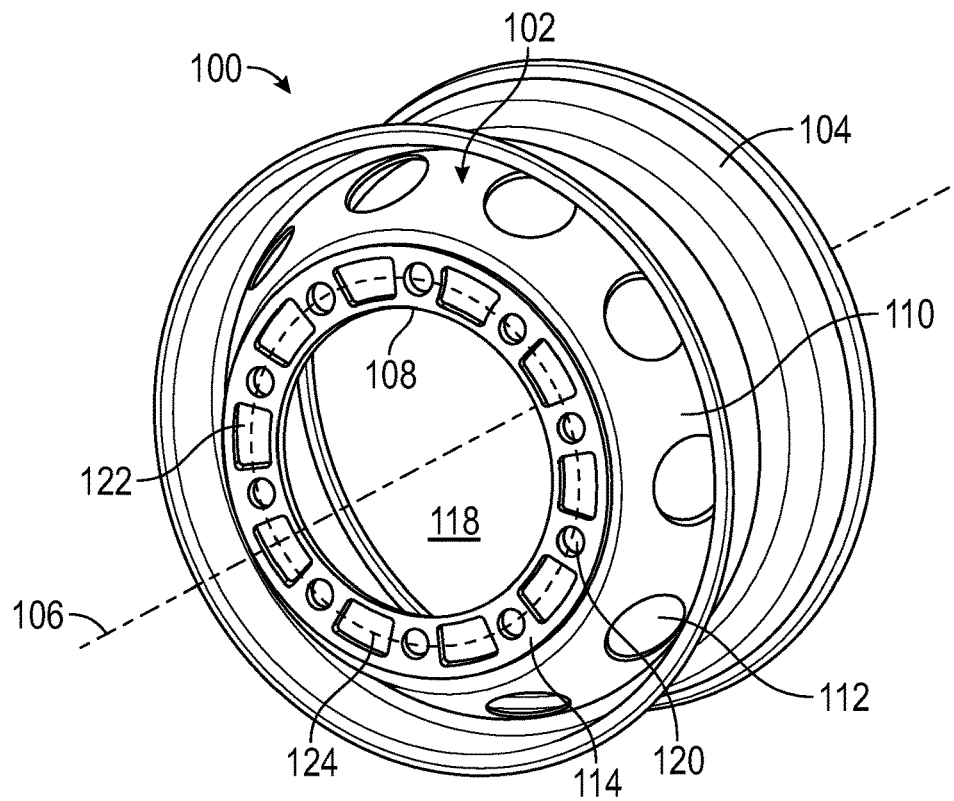
FIG. 1 is a perspective view of a fabricated vehicle wheel having a wheel disc in accordance with a first embodiment of the present invention.
Figure 2:
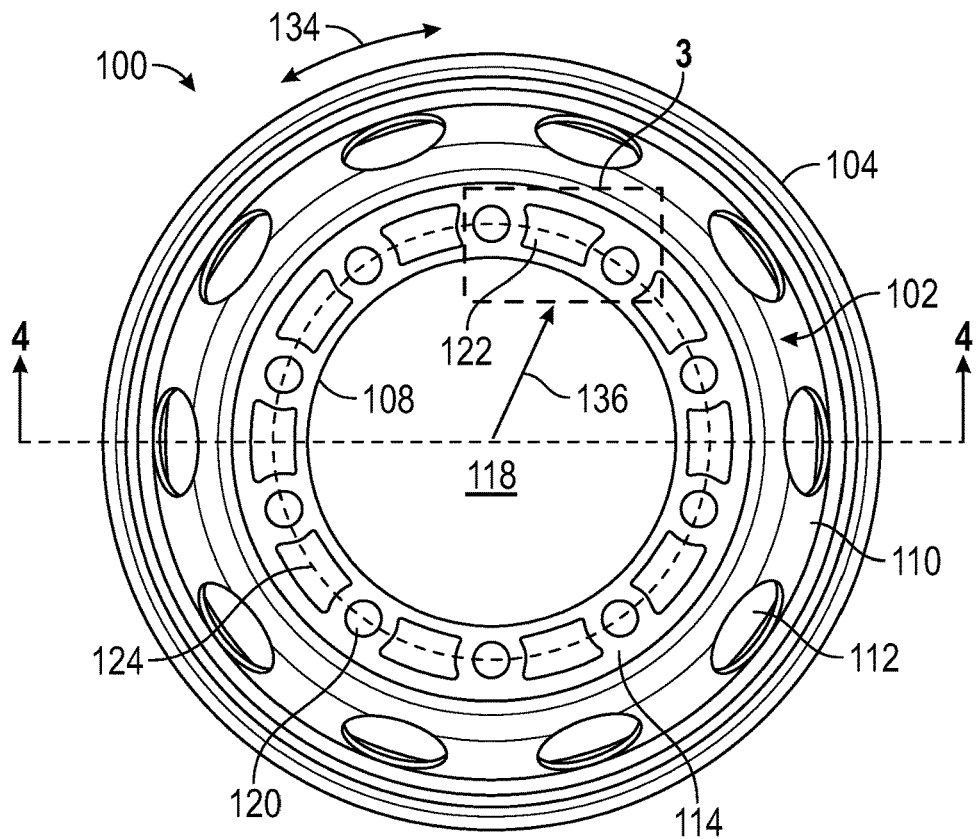
FIG. 2 is an elevation view of the vehicle wheel of FIG. 1.

Referring now to FIGS. 1-6 there is illustrated a fabricated vehicle wheel, indicated generally at 100, for a vehicle. The vehicle wheel 100 has a wheel disc, indicated generally at 102, in accordance with a first embodiment of the present invention. The vehicle wheel 100 further has a wheel rim 104 and a wheel axis 106. A tire is intended to be mounted or otherwise installed on the wheel rim 104. When the vehicle wheel 100 is mounted or otherwise installed on the vehicle, the vehicle wheel 100 rotates about the wheel axis 106.

As illustrated, the wheel disc 102 and wheel rim 104 are separately produced—e.g., as separate components—and then joined together by suitable means, such as for example by welding, to produce the vehicle wheel 100.

As non-limiting examples, the vehicle wheel 100 may be formed from aluminum, steel, magnesium, or titanium. The wheel disc 102 and the wheel rim 104 may be formed from similar or different materials. As a non-limiting example, the wheel disc 102 and the wheel rim 104 may both be formed from steel or aluminum. As a further non-limiting example, the wheel disc 102 may be formed from aluminum or alloys thereof or other suitable materials and the wheel rim 104 may be formed from steel or other suitable materials.

The wheel disc 102 has an annular hub or wheel mounting portion 108 and an extension portion 110. The hub portion 108 extends perpendicular to the wheel axis 106 and the extension portion 110 extends generally along the wheel axis 106. In extending generally along the wheel axis 106, the extension portion 110 spans between, and connects, the wheel rim 104 and the hub portion 108. The extension portion 110 is connected to the wheel rim 104 by a suitable means. As a non-limiting example, the extension portion 110 may be welded to the wheel rim 104.

The extension portion 110 may be provided with one or more ventilation openings 112. As illustrated, the ventilation openings 112 are circular in shape. Alternatively, the ventilation openings 112 may be other than circular in shape or the ventilation openings 112 may be omitted. Furthermore, a quantity other than the illustrated quantity of the ventilation openings 112 may be provided.

The hub portion 108 has an outboard face 114 (best shown in FIGS. 1-3), an inboard face 116 (best shown in FIG. 6), and a center hub hole 118 that extends through the hub portion 108 and between the outboard and inboard faces 114 and 116, respectively. Broadly, the outboard face 114 is defined on a side of the vehicle wheel 100 intended to face the vehicle upon which the vehicle wheel 100 is mounted. More specifically, and as will be discussed further, the outboard face 114 mounts against the vehicle. The inboard face 116 is defined on a side of the hub portion 108 opposite the outboard face 114. The wheel axis 106 passes through the center hub hole 118.

As illustrated, the hub portion 108 is planar, although such is not necessary, and extends in a direction perpendicular to the wheel axis 106. More specifically, the outboard face 114 is preferably a plane perpendicular to the wheel axis 106. As stated, the outboard face 114 mounts against the vehicle when the vehicle wheel 100 is mounted on the vehicle. As a non-limiting example, the vehicle wheel 100 may be mounted on an axle (not shown) of the vehicle and the outboard face 114 may mount to an axle hub of the axle.

Circumferentially spaced around the hub hole 118 are a plurality of lug bolt receiving holes 120. The lug bolt holes 120 are in the hub portion 108. As illustrated, the lug bolt holes 120 are evenly spaced around the hub hole 118 although such is not necessary. As illustrated, the hub portion 108 has ten lug bolt holes 120. Alternatively, the number, location, and/or spacing of the lug bolt holes 120 may be other than as illustrated. The lug bolt holes 120 receive lug bolts (not shown) for mounting the vehicle wheel 100 with nuts (not shown) on the vehicle.

Also circumferentially spaced around the hub hole 118 are a plurality of lightener pockets 122. As used herein, "lightener pocket" refers to any pocket, member, portion, void, or other part of the wheel disc 102 from which mass has been removed or otherwise reduced. As such, the lightener pockets 122 remove mass from the wheel disc 102. This results in a reduced weight for the wheel disc 102 and the vehicle wheel 100 as a whole.

The lightener pockets 122 are in the outboard face 114. As illustrated, the lightener pockets 122 are recesses, pockets, openings, or voids that extend from the outboard face 114 into the hub portion 108 without extending through the hub portion 108—e.g., without extending to the inboard face 116. Preferably, as a non-limiting example, the lightener pockets 122 remove between zero and two percent of the mass the wheel disc 102 would otherwise have without the lightener pockets 122. Preferably, as a non-limiting example, the lightener pockets 122 cover between zero and fifty percent of the surface area of the outboard face 114.

The lightener pockets 122 may be formed by removing material from the wheel disc 102. As non-limiting examples, the material may be removed from the wheel disc 102 by machining, milling, piercing, laser cutting, or water cutting. Alternatively, the lightener pockets 122 may be formed during stamping or forging of the wheel disc 102—i.e., the lightener pockets 122 may be forged into the wheel disc 102 when the wheel disc 102 is forged.

As illustrated, the hub portion 108 has ten lightener pockets 122. Alternatively, a quantity of the lightener pockets 122 may be more or less than the ten lightener pockets 122 illustrated. As illustrated the quantity of the lightener pockets 122 is equal to a quantity of the lug bolt holes 120. Alternatively, the quantity of the lightener pockets 122 may be more or less than the quantity of the lug bolt holes 120.

As illustrated, the lightener pockets 122 are evenly spaced around the hub hole 118 although such is not necessary. As further illustrated, the lightener pockets 122 are interspaced with the lug bolt holes 120. Specifically, the lug bolt holes 120 and the lightener pockets 122 alternate along a circumference 124 (shown by dashed lines) of the wheel disc 102. Alternatively, the lightener pockets 122 may be interspaced with the lug bolt holes 120 other than as illustrated. As non-limiting examples, more than one of the lightener pockets 122 may be provided between consecutive lug bolt holes 120 or none of the lightener pockets 122 may be provided between consecutive lug bolt holes 120.

As illustrated, the lug bolt holes 120 and the lightener pockets 122 are both arrayed along the same circumference 124. As such, the lightener pockets 122 are neither radially inward or outward of the lug bolt holes 120. Alternatively, the lightener pockets 122 may be radially inward or radially outward of the lug bolt holes 120. Alternatively, some of the lightener pockets 122 may be radially inward of the lug bolt holes 120 and others of the lightener pockets 122 may be radially outward of the lug bolt holes 120. Alternatively, some of the lightener pockets 122 may be on the circumference 124 with the lug bolt holes 120 while others of the lightener pockets 122 are radially inward and/or outward of the circumference 124.

Figure 3:
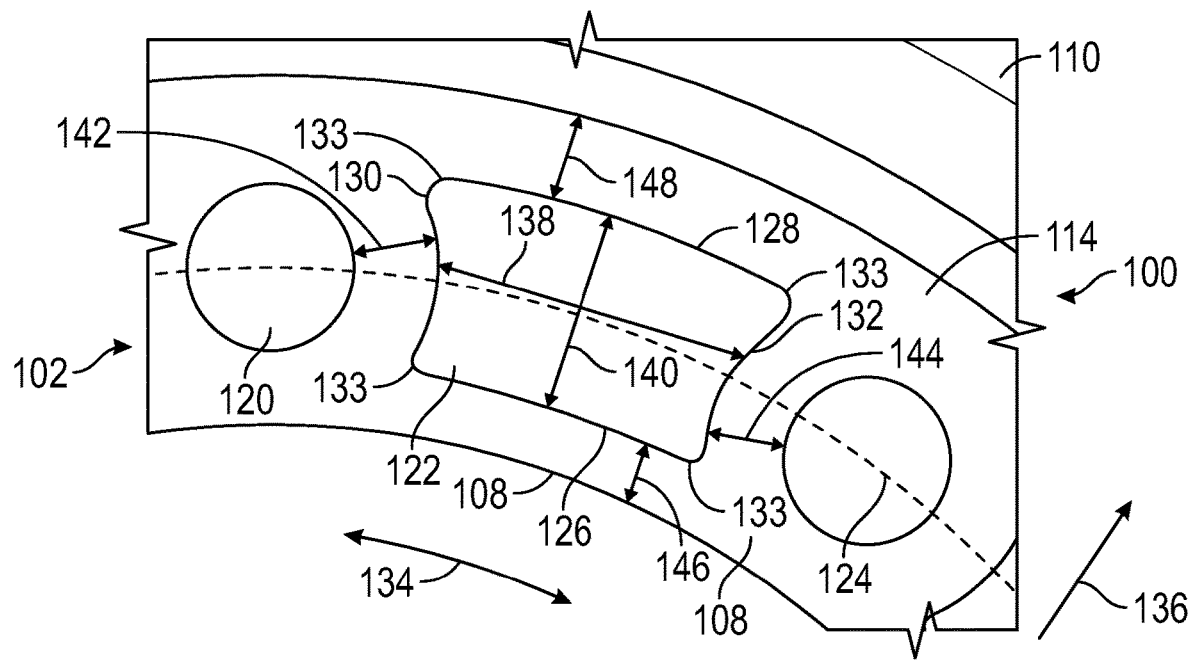
FIG. 3 is an enlarged portion of FIG. 2.
Figure 4:
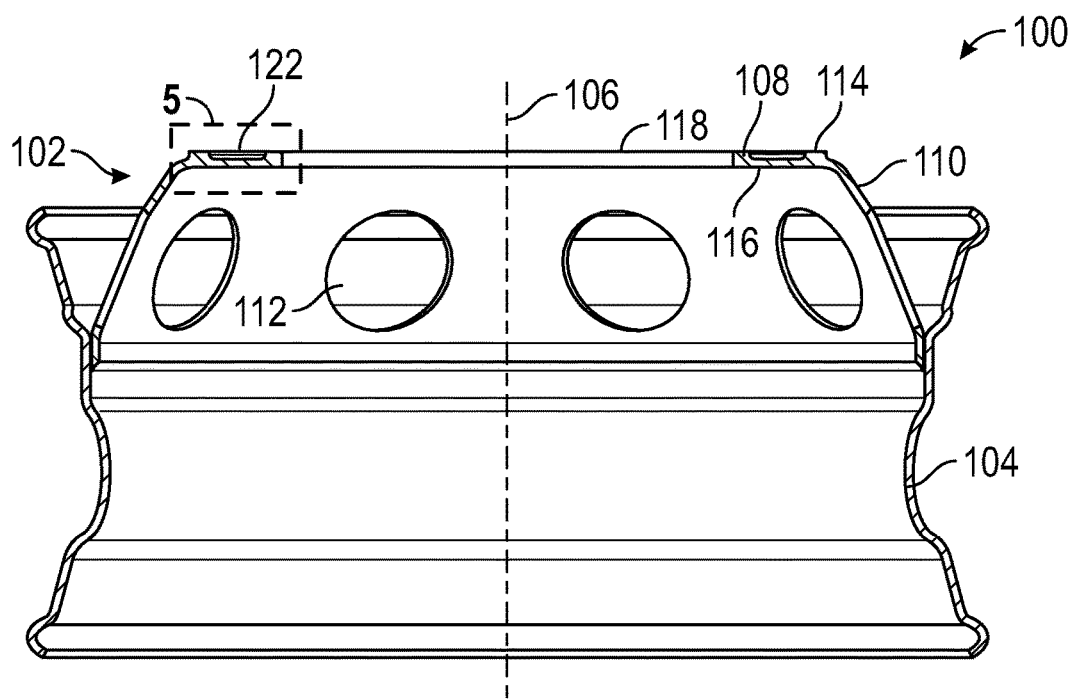
FIG. 4 is a section view along line 4-4 of FIG. 2.

Referring specifically to FIG. 3, a representative one of the lightener pockets 122 is illustrated in an elevation view. The lightener pocket 122 is defined by first, second, third, and fourth sides 126, 128, 130, and 132, respectively. The first, second, third, and fourth sides 126, 128, 130, and 132, respectively, are connected by curved, radius, or other transition portions 133. Thus, the lightener pockets 122 have four sides. Alternatively, the lightener pockets 122 may have other than the four sides illustrated and described. Furthermore, the lightener pockets 122 may have a shape other than as illustrated in FIG. 3. As non-limiting examples, the lightener pockets 122 may have a rectilinear, circular, oval, elliptical, or variable radius shape. Furthermore, all of the lightener pockets 122 need not have the same shape. As a non-limiting example, some of the lightener pockets 122 may have a first shape while others of the lightener pockets 122 have a second shape.

The first and second sides 126 and 128, respectively, are arcuate and extend in a circumferential direction 134. The third and fourth sides 130 and 132, respectively, are also arcuate and extend generally in a radial direction 136. The lightener pockets 122 have a circumferential dimension 138 and a radial dimension 140.

Furthermore, there are first and second dimensions 142 and 144, respectively, between the lightener pocket 122 and the adjacent lug bolt holes 120. The first and second dimensions 142 and 144, respectively, are measured radially from a center point of each of the lug bolt holes 120. As illustrated, the first and second dimensions 142 and 144, respectively, are equal although such is not necessary.

There is also an inner radial dimension 146 between the hub hole 118 and the lightener pockets 122 and an outer radial dimension 148 between the lightener pockets 122 and the extension portion 110. As illustrated the inner radial dimension 146 is less than the outer radial dimension 148, although such is not necessary.

Figure 5:
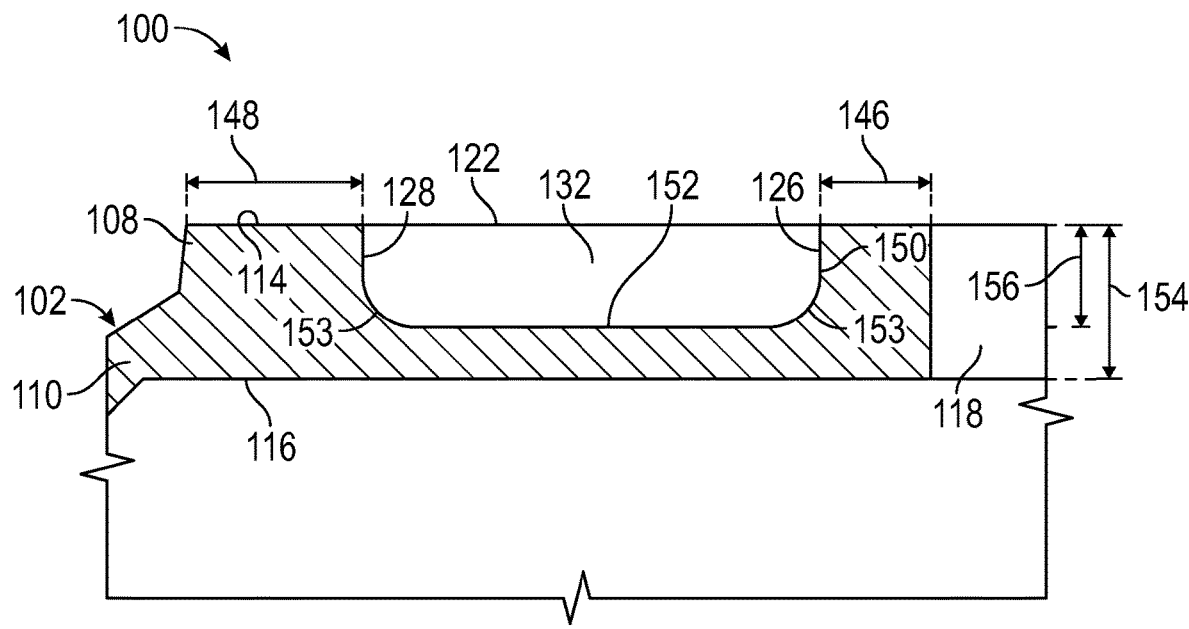
FIG. 5 is an enlarged portion of FIG. 4.
Figure 6:
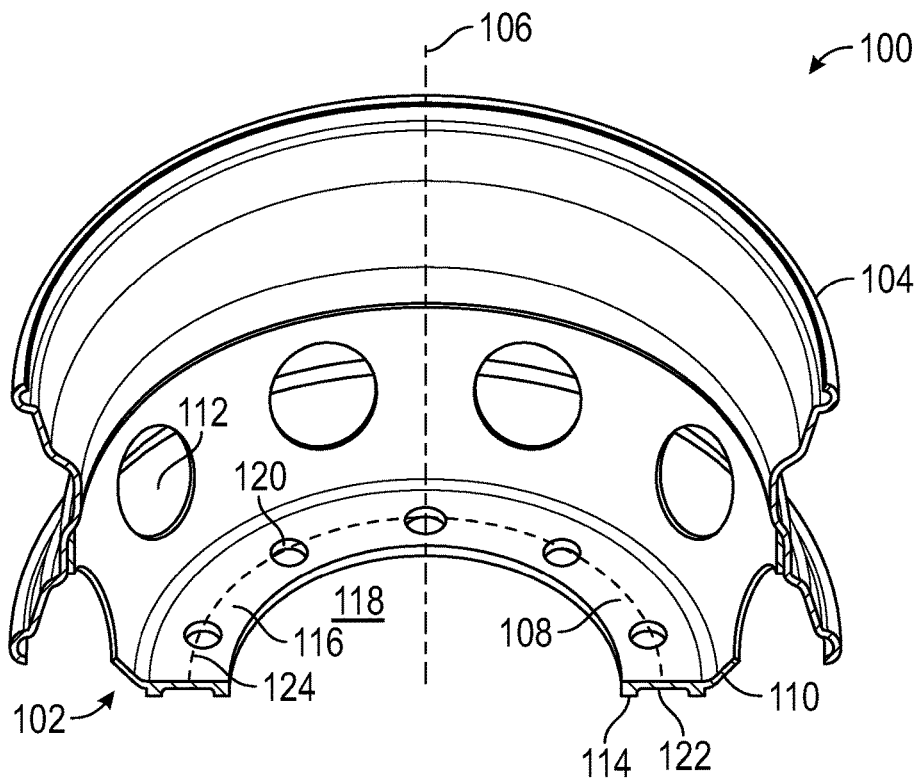
FIG. 6 is an additional section view of the vehicle wheel of FIG. 1.
Figure 7:
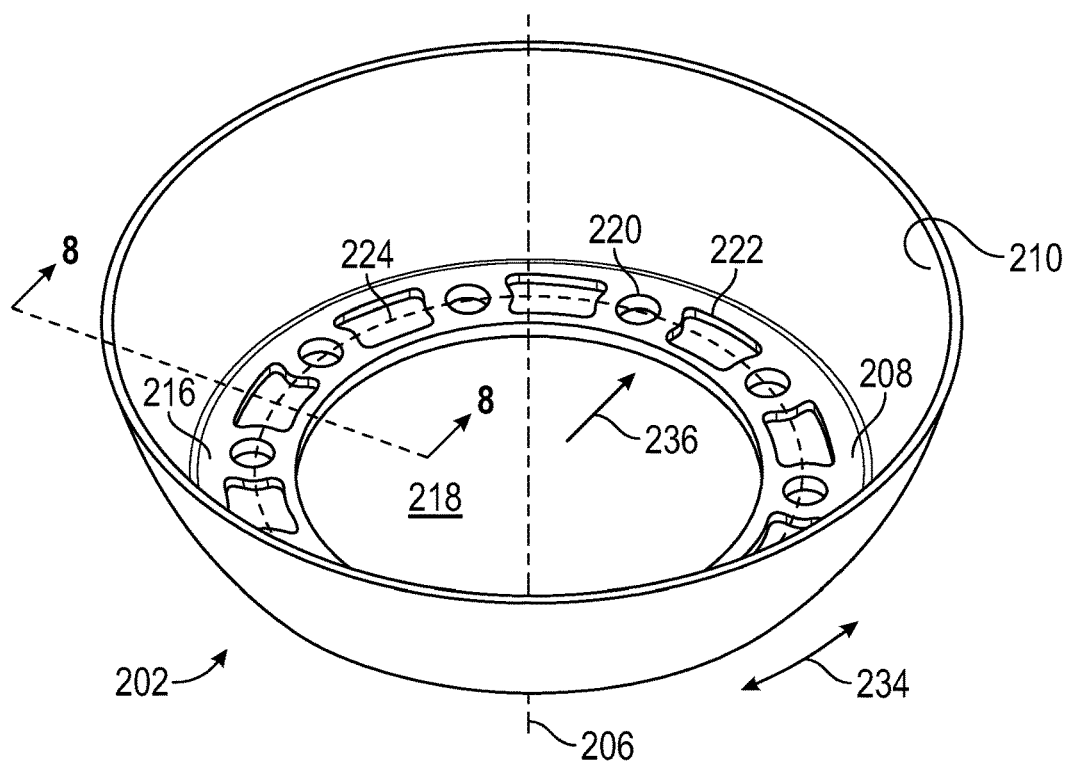
FIG. 7 is a perspective view of a wheel disc in accordance with a second embodiment of the present invention.
Figure 8:
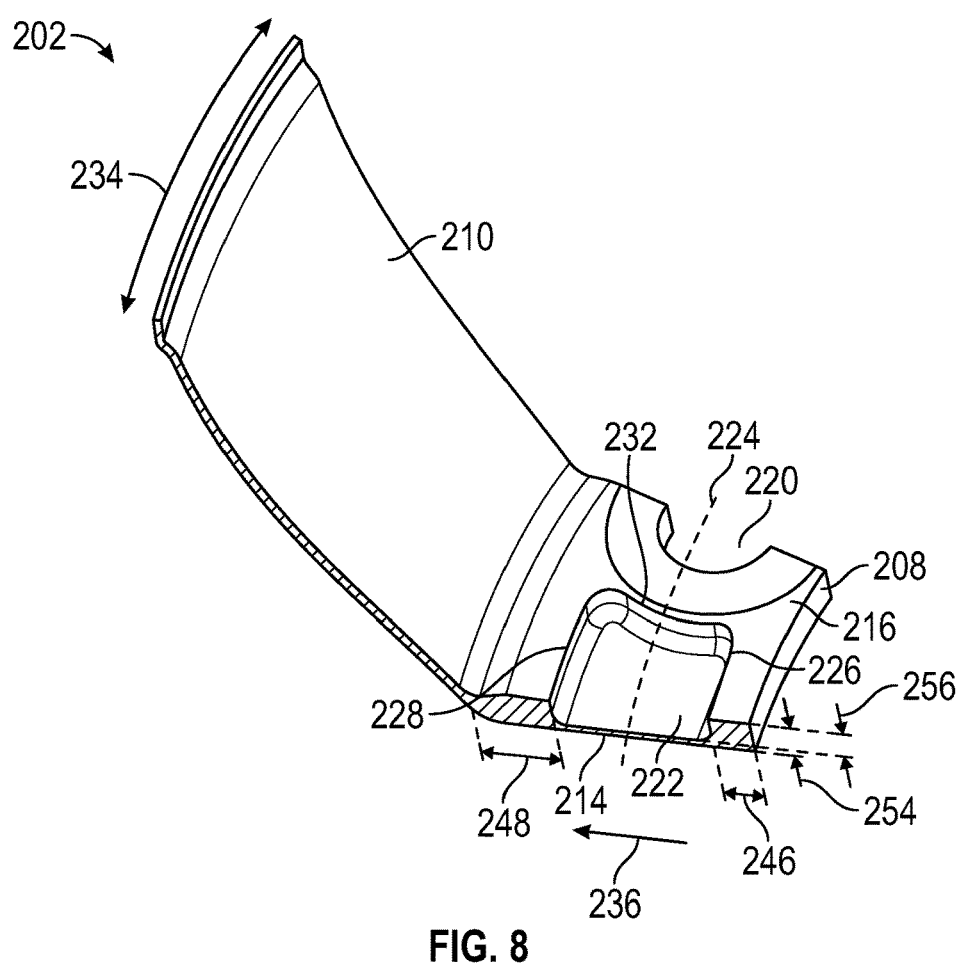
FIG. 8 is a section view taken along line 8-8 of FIG. 7.
Figure 9:
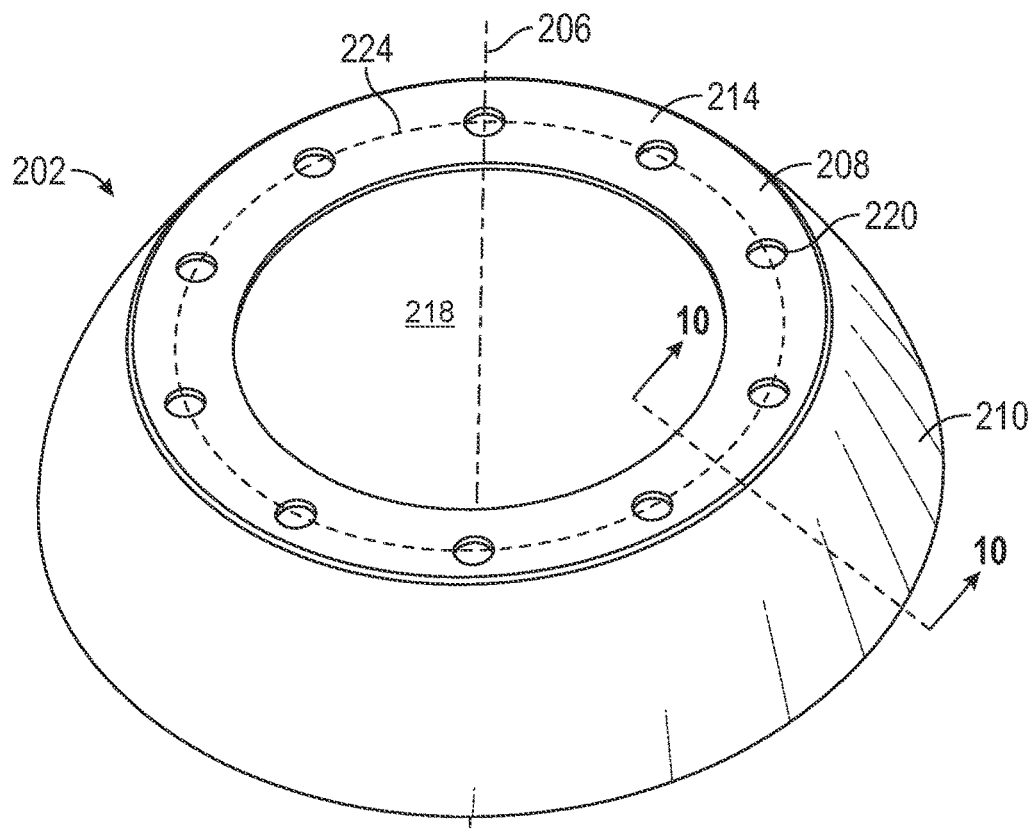
FIG. 9 is an additional perspective view of the wheel disc of FIG. 7.
Figure 10:
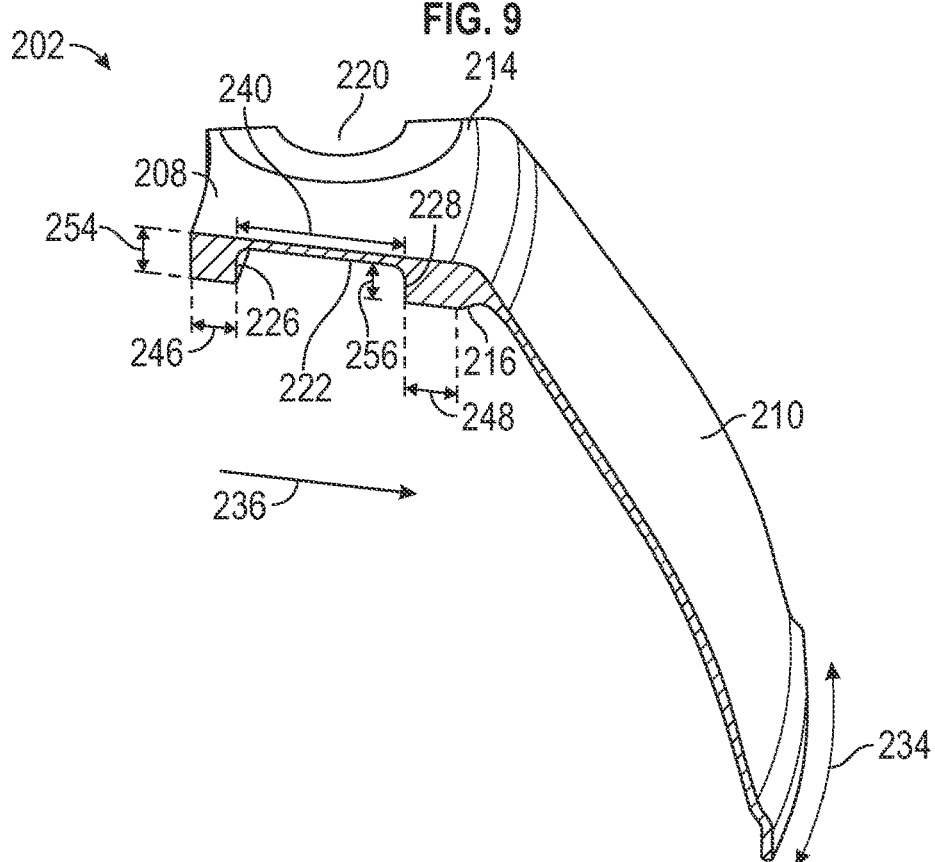
FIG. 10 is a section view taken along line 10-10 of FIG. 9.

Referring specifically to FIG. 5, the representative one of the lightener pockets 122 is illustrated in section view. The lightener pockets 122 have a wall surface 150 and a bottom surface 152. The wall surface 150 extends between the bottom surface 152 and the outboard face 114. As such, the wall surface 150 corresponds to the first, second, third, and fourth sides 126, 128, 130, and 132, respectively, as well as the curved portions 133. Preferably, and as illustrated, a curved, radius, or other transition portion 153 connects the wall surface 150 and the bottom surface 152.

As illustrated, the lightener pockets 122 have a rectilinear cross section in both the circumferential and radial directions 134 and 136, respectively. Alternatively, the lightener pockets 122 may have other than the rectilinear cross section illustrated. As non-limiting examples, the lightener pockets 122 may have a triangular, trapezoidal, curved, variable radius, or otherwise non-linear cross section, or a mix of different types of cross sections. Furthermore, as illustrated, the lightener pockets 122 all have the same cross section. Alternatively, some of the lightener pockets 122 may have a first cross section while others of the lightener pockets 122 have a second cross section. Furthermore, the lightener pockets 122 may have other than the curved portion 153 connecting the wall surface 150 and the bottom surface 152. As non-limiting examples, the lightener pockets 122 may have a square or chamfer portion connecting the wall surface 150 and the bottom surface 152.

As illustrated, the wall surface 150 is substantially parallel to the wheel axis 106 and the bottom surface 152 is substantially perpendicular to the wheel axis 106. Alternatively, one or both of the wall surface 150 and the bottom surface 152 may be other than as illustrated. As a non-limiting example, the wall surface 150 may be transverse to the wheel axis 106 or otherwise curved or non-linear. As a further non-limiting example, the bottom surface 152 may be other than perpendicular to the wheel axis 106 or otherwise curved or non-linear.

The hub portion 108 has a thickness 154 and the lightener pockets 122 have a depth 156. Preferably, as a non-limiting example, the depth 156 is between twenty five and one hundred percent of the thickness 154. Furthermore, the depth 156 may vary between two of the lightener pockets 122 or vary within a single of the lightener pockets 122.

As illustrated and discussed, the vehicle wheel 100 is preferably a fabricated commercial vehicle wheel for use with a commercial vehicle and. also is preferably constructed of steel. Alternatively, the vehicle wheel 100 may be other than a commercial vehicle wheel and/or formed from other materials than steel, either similar or dissimilar materials.

Furthermore, although the invention has been illustrated and described in conjunction with the particular vehicle wheel construction disclosed herein, it will be appreciated that the invention can be used in conjunction with other types of vehicle wheel constructions.

Referring now to FIGS. 7-10, there is illustrated a wheel disc 202 according to a second embodiment of the present invention. The wheel disc 202 is a variation of the wheel disc 102 described with reference to FIGS. 1-6. As such, like reference numbers, increased by 100, designate corresponding parts in the drawings and detailed description thereof will be omitted, unless otherwise noted.

Lightener pockets 222 extend as recesses or pockets into a hub portion 208 from an inboard face 216 of the hub portion 208. Furthermore, while not illustrated, the wheel disc 202 may be provided with ventilation holes.

Figure 11:
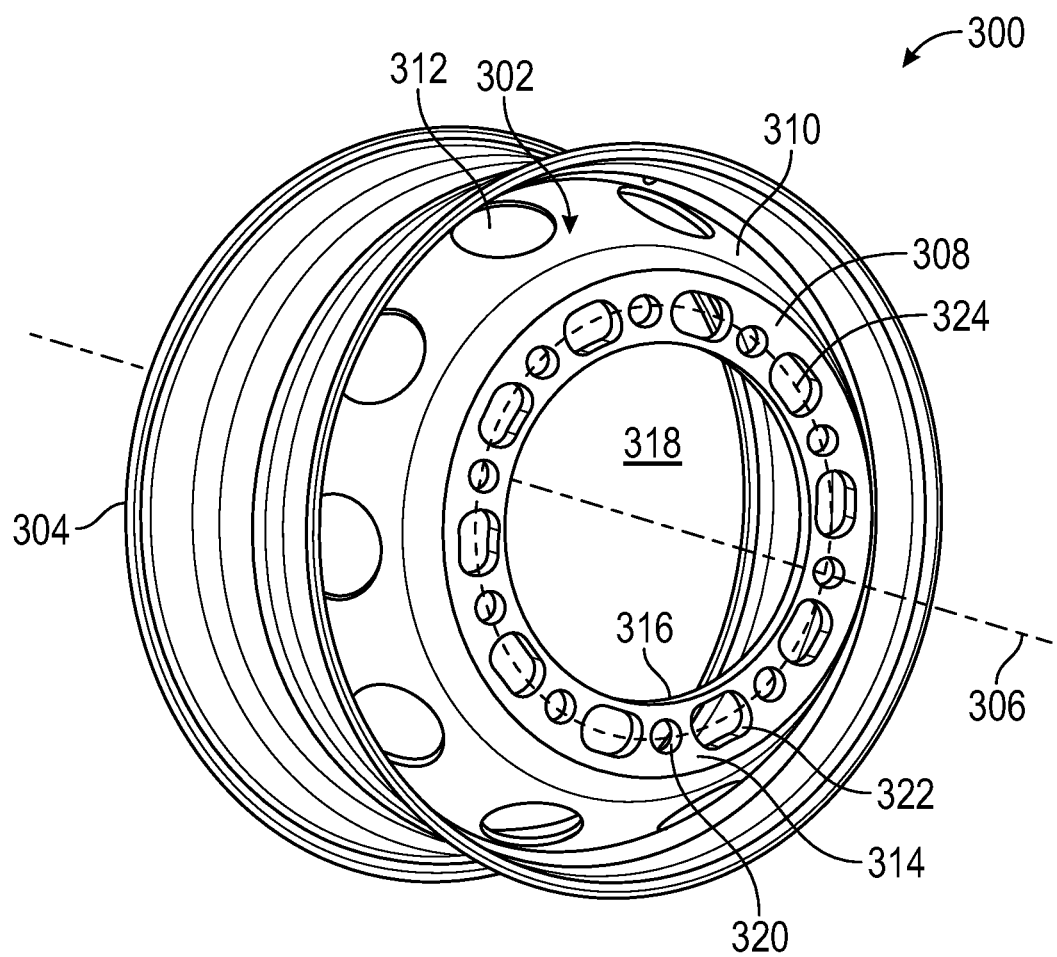
FIG. 11 is a perspective view of a vehicle wheel having a wheel disc in accordance with a third embodiment of the present invention.

Referring now to FIG. 11, there is illustrated a vehicle wheel 300 having a wheel disc 302 according to a third embodiment of the present invention. The vehicle wheel 300 and the wheel disc 302 are a variation of the vehicle wheel 100 and the wheel disc 102 described with reference to FIGS. 1-6. As such, like reference numbers, increased by 200, designate corresponding parts in the drawings and detailed description thereof will be omitted, unless otherwise noted.

Lightener pockets 322 extend through a hub portion 308. As illustrated, the lightener pockets 322 extend through the hub portion 308 by having separate openings in each of an outboard face 314 and an inboard face 316. Alternatively, the lightener pockets 322 may have a first opening in one of the outboard face 314 or the inboard face 316 and a second opening in other than the outboard face 314 or the inboard face 316. Alternatively, the lightener pocket 322 may be an opening through the hub portion 308 but have first and second openings in other than the outboard face 314 and the inboard face 316.

As illustrated, the lightener pockets 322 have a constant cross section perpendicular to a wheel axis 306. Alternatively, the lightener pockets 322 may have a variable cross section between the outboard and inboard faces 314 and 316, respectively. As non-limiting examples, the cross sections of the lightener pockets may increase or decrease from the outboard face 314 to the inboard face 316. Furthermore, all of the lightener pockets 322 need not have the same cross sections in a direction along the wheel axis 306.

Figure 12:
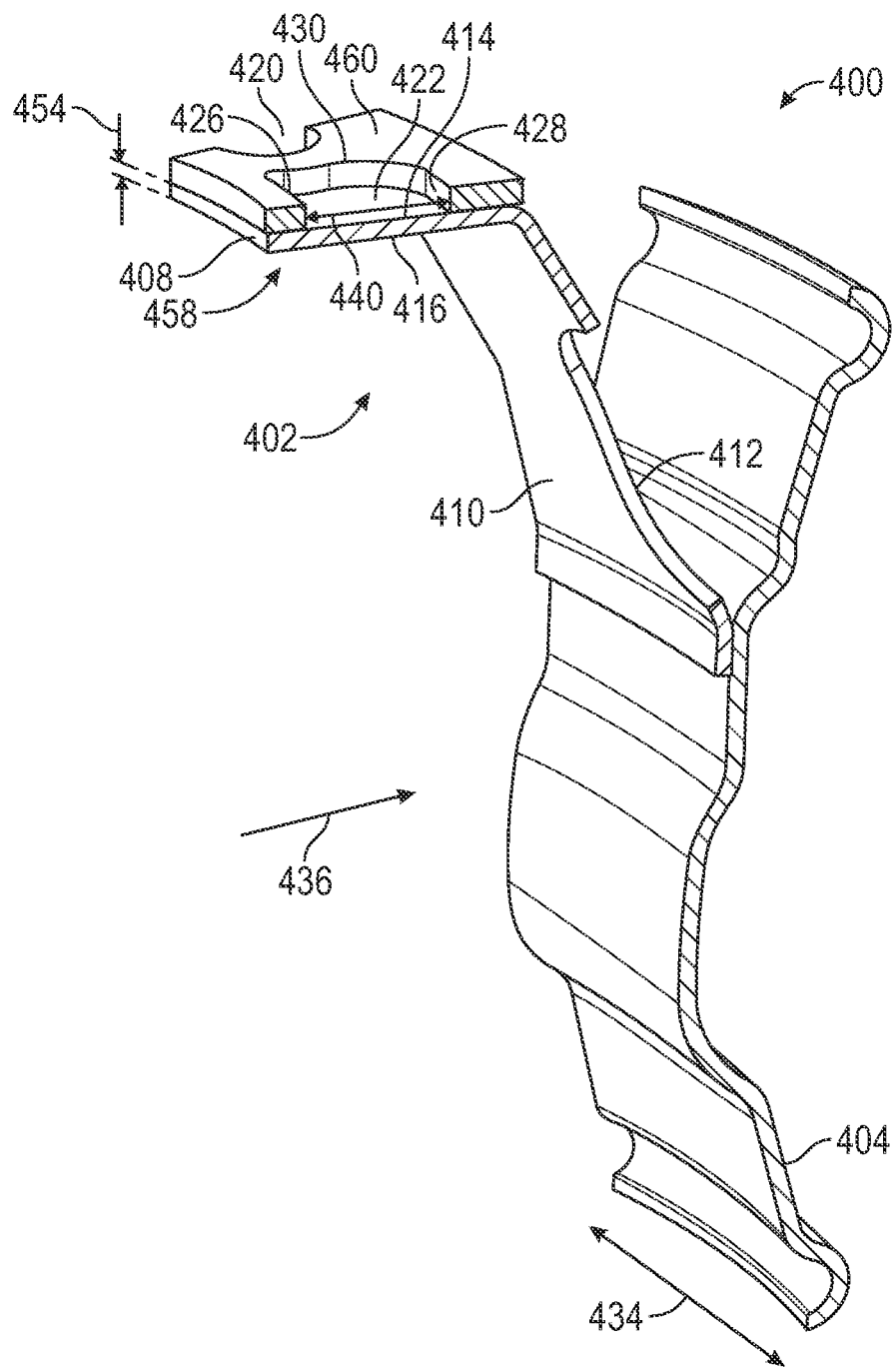
FIG. 12 is a section view of a vehicle wheel having a wheel disc in accordance with a fourth embodiment of the present invention.

Referring now to FIG. 12, there is illustrated a vehicle wheel 400 having a wheel disc 402 according to a fourth embodiment of the present invention. The vehicle wheel 400 and the wheel disc 402 are a variation of the vehicle wheel 100 and the wheel disc 102 described with reference to FIGS. 1-6. As such, like reference numbers, increased by 300, designate corresponding parts in the drawings and detailed description thereof will be omitted, unless otherwise noted.

A hub portion, indicated generally at 458 comprises a first hub portion 408 and an annular hub plate 460. Lightener pockets 422 are provided in the hub plate 460 and not in the first hub portion 408—i.e., the first hub portion 408 is without the lightener pockets 422. The hub plate 460 dimensionally corresponds to an outboard face 414 of the first hub portion 408—i.e., the hub plate 460 and the outboard face 414 have corresponding surface areas. The hub plate 460 is a separate component that is joined or otherwise secured to the outboard face 414 such that the first hub portion 408 and the hub plate 460 together become the hub portion 458. Alternatively, the hub plate 460 may correspond to an inboard face 416 of the first hub portion 408 and be joined or otherwise secured to the inboard face 416.

As illustrated, the lightener pockets 422 extend through the hub plate 460. Alternatively, some or all of the lightener pockets 422 may be recesses or pockets that extend into, but not through, the hub plate 460. The lightener pockets 422 may extend into a first or second side of the hub plate 460, regardless of whether the hub plate 460 is joined or otherwise secured to the outboard face 414 or the inboard face 416.

Lug bolt holes 420 pass through both the first hub portion 408 and the hub plate 460.

The principle and mode of operation of this invention have been described in its various embodiments. However, it should be noted that this invention may be practiced otherwise than as specifically illustrated and described without departing from its scope.

What is claimed is:

1. A fabricated wheel disc for a vehicle wheel, the fabricated wheel disc comprising:
an annular hub portion having an outboard face and an inboard face;
an extension portion extending from the hub portion;
a plurality of lug bolt holes in the hub portion; and
a center hub hole in the hub portion;
wherein at least one lightener pocket is provided in the hub portion, wherein the at least one lightener pocket extends through the hub portion by having separate openings in each of the outboard face and the inboard face of the hub portion.

2. The fabricated wheel disc of claim 1 further comprising:
a wheel rim secured to the extension portion.

3. The fabricated wheel disc of claim 1 wherein the at least one lightener pocket is interspaced with the lug bolt holes.

4. The fabricated wheel disc of claim 3 wherein the at least one lightener pocket is one of a plurality of lightener pockets and the lightener pockets and the lug bolt holes alternate around a circumference of the hub portion.

5. The fabricated wheel disc of claim 4 wherein some of the plurality of lightener pockets have a first shape and others have a second shape different from the first shape.

6. The fabricated wheel disc of claim 1 wherein the at least one lightener pocket has a rectilinear, circular, oval, elliptical, or variable radius shape.

7. The fabricated wheel disc of claim 1 wherein the at least one lightener pocket is between zero and fifty percent of a surface area of either the outboard face or the inboard face.

8. The fabricated wheel disc of claim 1 wherein the at least one lightener pocket is formed by removing material from the hub portion.

9. The fabricated wheel disc of claim 8 wherein the material is removed from the hub portion by machining, milling, piercing, laser cutting, or water cutting.

10. The fabricated wheel disc of claim 2 wherein the wheel rim and wheel disc are formed from similar or dissimilar materials.

11. The fabricated wheel disc of claim 1 wherein the vehicle wheel is a steel commercial vehicle wheel.

* * * * *